United States Patent
Vangala et al.

(10) Patent No.: US 10,230,808 B2
(45) Date of Patent: Mar. 12, 2019

(54) PAGE PRIORITY INDICATIONS FOR REDUCED PUSH LOAD ON CELLULAR NETWORKS

(71) Applicant: Apple Inc., Cupertino, CA (US)

(72) Inventors: Sarma V. Vangala, San Jose, CA (US); Rohan C. Malthankar, San Jose, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/710,926

(22) Filed: Sep. 21, 2017

(65) Prior Publication Data

US 2018/0131781 A1    May 10, 2018

Related U.S. Application Data

(60) Provisional application No. 62/418,555, filed on Nov. 7, 2016.

(51) Int. Cl.
*H04L 29/08* (2006.01)
*H04W 68/00* (2009.01)
*H04W 52/02* (2009.01)

(52) U.S. Cl.
CPC ......... *H04L 67/26* (2013.01); *H04W 52/0258* (2013.01); *H04W 68/005* (2013.01)

(58) Field of Classification Search
None
See application file for complete search history.

(56) References Cited

U.S. PATENT DOCUMENTS

| | | | |
|---|---|---|---|
| 8,024,452 B2 | 9/2011 | Shenfield et al. | |
| 8,620,276 B2 | 12/2013 | Khoury | |
| 9,491,131 B1* | 11/2016 | Herrick | G06F 3/0482 |
| 9,603,094 B2 | 3/2017 | Wood et al. | |
| 2014/0337424 A1* | 11/2014 | Lee | H04L 63/0823 |
| | | | 709/204 |
| 2014/0362768 A1* | 12/2014 | Wood | H04L 67/322 |
| | | | 370/328 |
| 2016/0212268 A1 | 7/2016 | Kansal et al. | |
| 2017/0005974 A1 | 1/2017 | Wheeler et al. | |
| 2017/0126826 A1* | 5/2017 | Liu | H04M 1/72552 |
| 2018/0270520 A1* | 9/2018 | Ott | H04N 21/44218 |

* cited by examiner

*Primary Examiner* — Hong S Cho
(74) *Attorney, Agent, or Firm* — Meyertons Hood Kivlin Kowert & Goetzel, P.C.; Jeffrey C. Hood; Matthew C. Washburn

(57) ABSTRACT

This disclosure relates to techniques for UEs to improve reception of push notifications via a cellular network. A UE may be configured to provide, to a push notification service, preference information for push notifications associated with an application. The preference information may indicate a preferred period of delivery for the push notifications. When the push notification service receives a push notification addressed to the UE, the push notification service includes the preference information when notifying the cellular network. The cellular network provides a page to the UE, including the preference information. Based on the preference information in the page, the UE may decide whether, and in some scenarios how long, to delay before establishing a connection to receive the available push notification. The network, having access to the preference information, may accommodate the delay.

20 Claims, 5 Drawing Sheets

PAGE PRIORITY INDICATIONS FOR REDUCED PUSH LOAD ON CELLULAR NETWORKS

PRIORITY INFORMATION

This application claims priority to U.S. provisional patent application Ser. No. 62/418,555, titled "Page Priority Indications for Reduced Push Load on Cellular Networks," by Sarma V. Vangala, et al., filed Nov. 7, 2016, which is hereby incorporated by reference in its entirety as though fully and completely set forth herein.

FIELD

The present application relates to wireless devices, and more particularly to an apparatus, system, and method for providing improved communication procedures for receiving push notifications.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to one or more of device design, antenna design or size, device size, battery size, current transmission medium conditions, and/or other factors) may be referred to in some instances as "link budget limited" devices.

In some situations, high-bandwidth application traffic can consume significant power of a mobile device, especially when network traffic is high or when radio frequency (RF) conditions are poor. Some of this application traffic may be non-critical, such as uploading photos or downloading applications or application updates. Techniques for reducing power consumption for these transmissions may be desired.

SUMMARY

Embodiments are presented herein of methods for providing improved communication performance for wireless devices, and of devices (e.g., wireless devices (UEs), base stations) configured to implement the methods. For example, embodiments presented herein may provide improved LTE or LTE-Advanced performance for wireless devices. Some embodiments may relate to a user equipment (UE) that comprises at least one antenna, at least one radio, and a processing element, and which is configured to perform a subset or all of the operations described herein.

According to techniques described herein, a mobile device (e.g., the UE) may provide, to a push notification service, first preference information for push notifications associated with a first user application. The first preference information may include, e.g., an indication of a preferred period of delivery for push notifications associated with the first user application. For example, the preferred period of delivery be one of: immediately, hourly, daily, or weekly. The mobile device may then receive a page indicating that a push notification is available for download by the mobile device, wherein the page indicates the first preference information. Based on the indicated first preference information, the mobile device may determine a delay period to wait before downloading the available push notification. Following expiration of the determined delay period (e.g., in response to expiration of the determined delay period), the mobile device may download the available push notification. The mobile device may not receive, during the determined delay period, a second page indicating that the same push notification is available for download by the mobile device.

In some embodiments, the mobile device may provide independent preference information for each of a plurality of applications.

In some embodiments, determining the delay period may be further based on a download history of push notifications associated with the indicated preference information, such as time elapsed since a most recent previous download of a push notification associated with the indicated preference information. For example, the mobile device may determine time elapsed since a most recent previous time at which the mobile device downloaded at least one push notification having the preferred frequency of delivery indicated by the first preference information; and determine the delay period to be the difference between the preferred period of delivery and the determined time elapsed.

Embodiments are also presented of apparatuses configured to implement any of the techniques described above.

The disclosed techniques may reduce congestion at the network and power consumption at the mobile device at least by reducing connection overhead.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
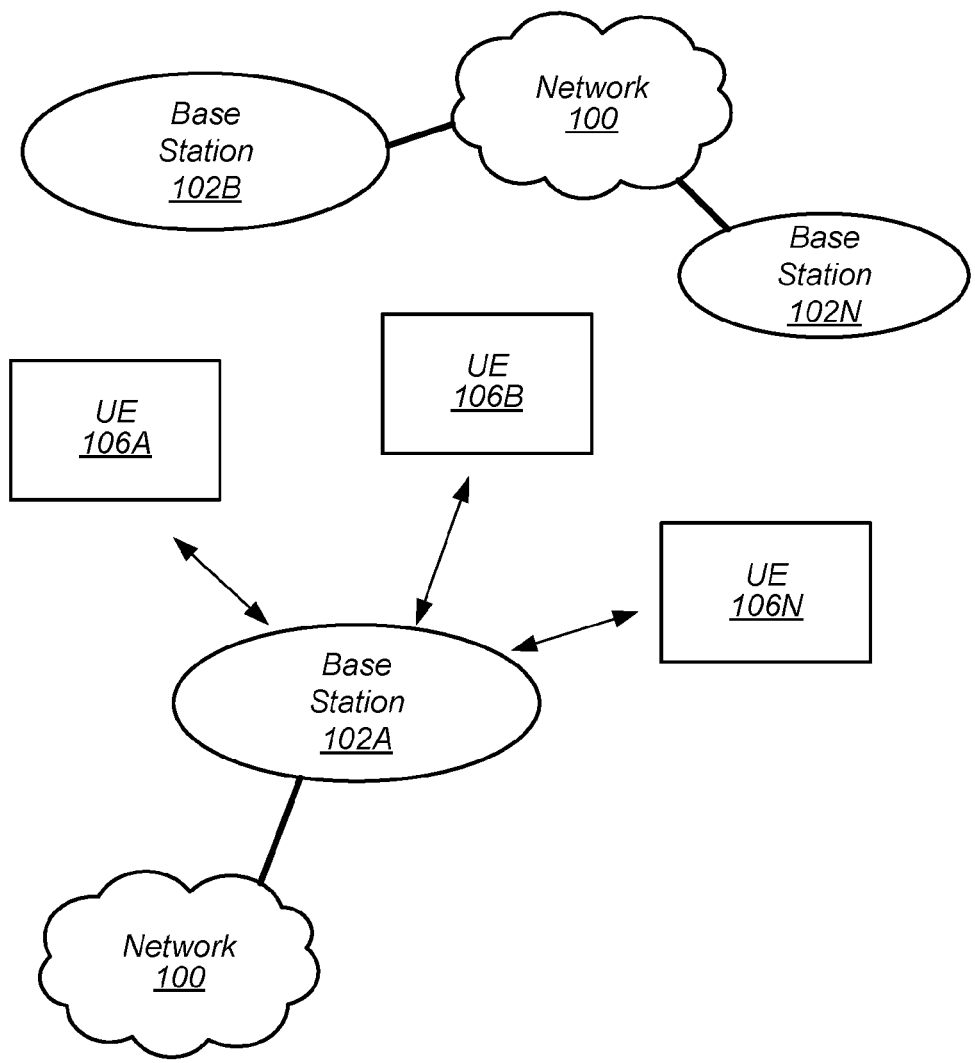
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
BS: Base Station
DSCP: Differentiated Services Code Point
GSM: Global System for Mobile Communications
IMSI: International Mobile Subscriber Identity
LTE: Long Term Evolution
MME: Mobility Management Entity
PNS: Push Notification Server
RRC: Radio Resource Control
TCP: Transmission Control Protocol
TIMSI: Temporary IMSI
UE: User Equipment
UMTS: Universal Mobile Telecommunications System
VoLTE: Voice over LTE
WCDMA: Wideband Code Division Multiple Access

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
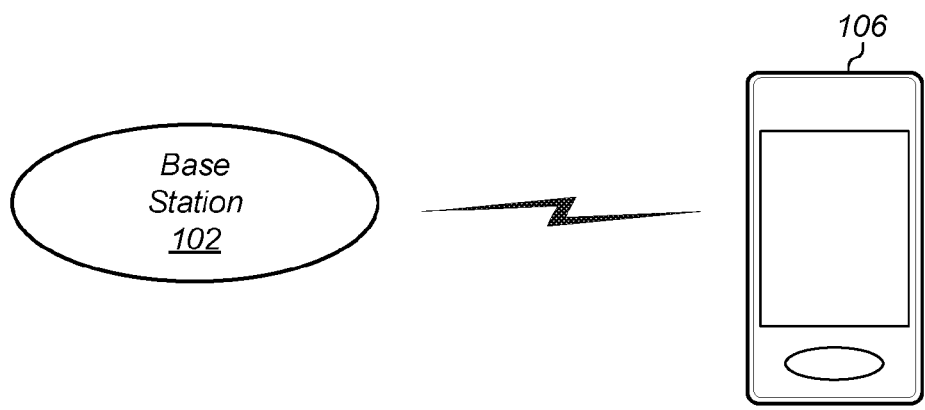
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." In some scenarios, each of a plurality of independent coverage areas of the base station may be referred to as a cell. The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
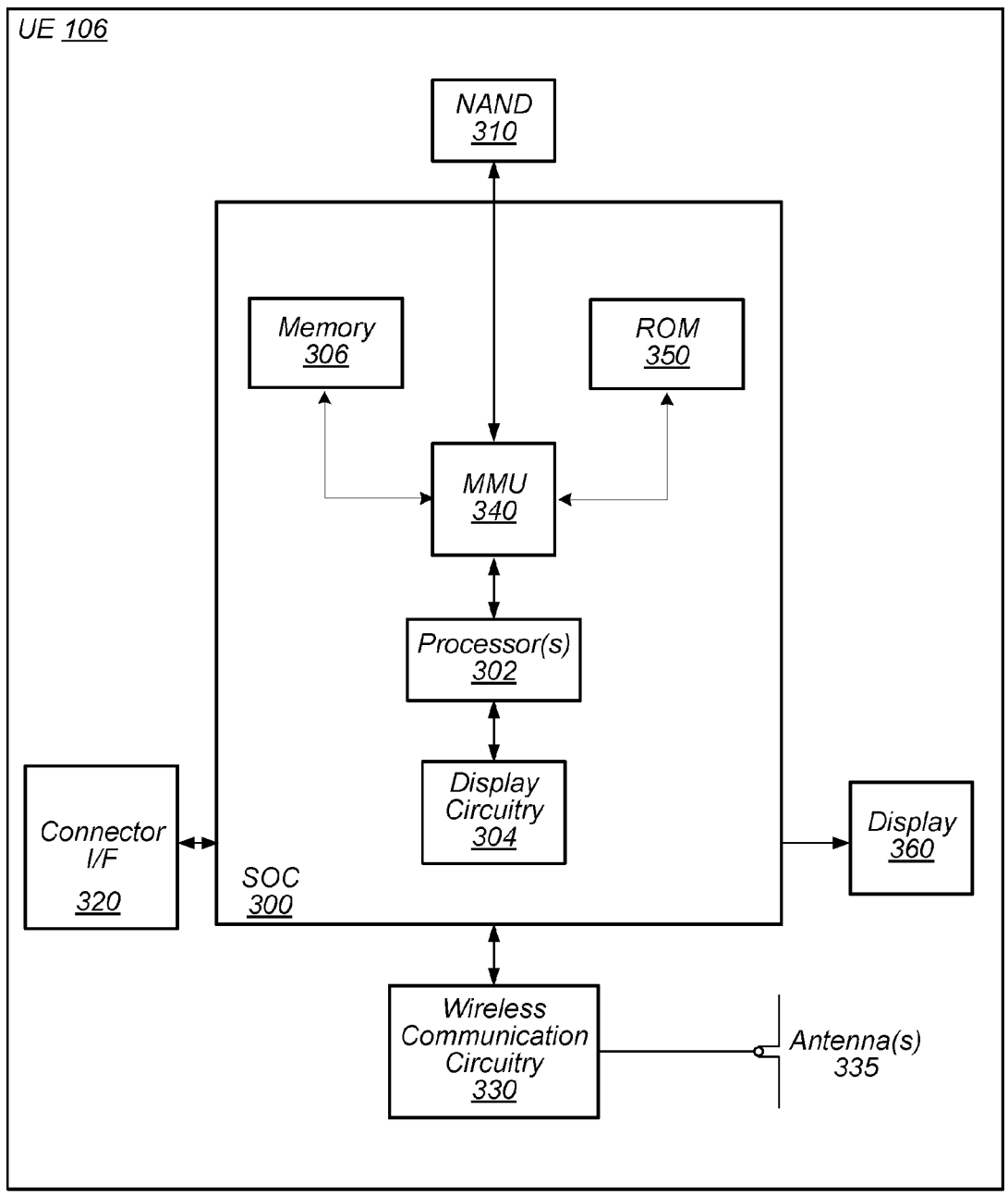
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Figure 4:
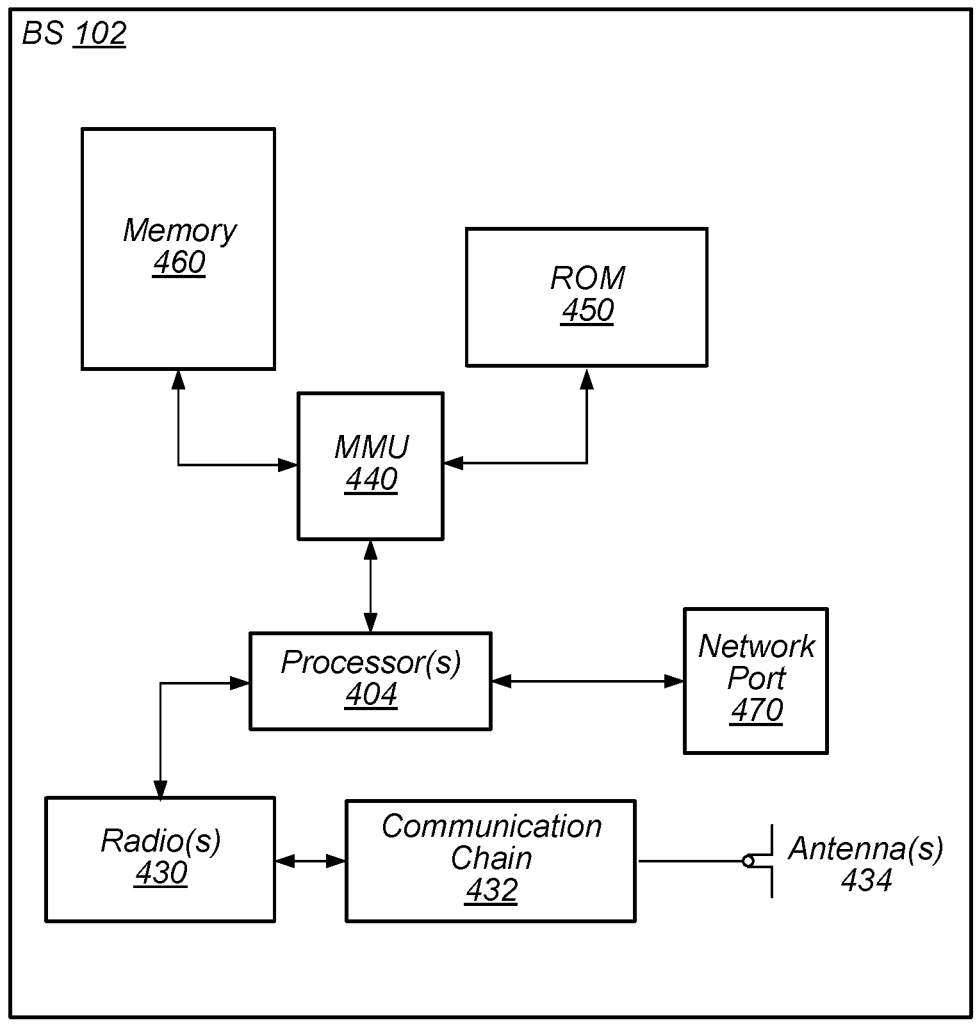
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate according to various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Figure 5:
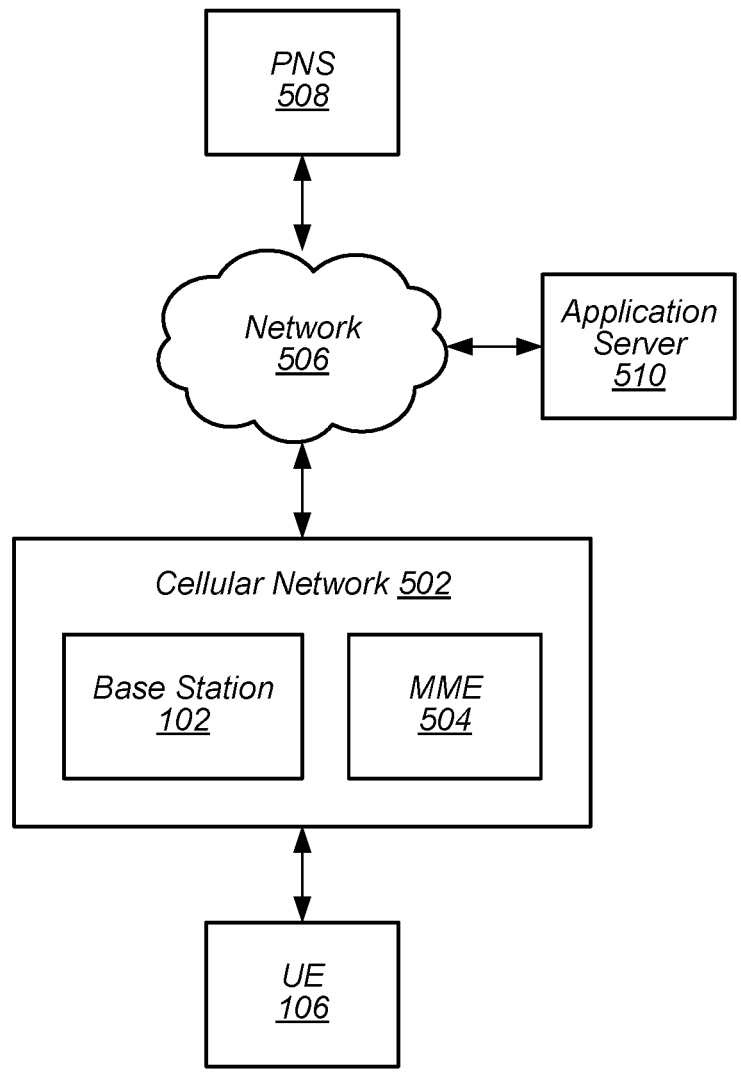
FIG. 5 illustrates an exemplary (and simplified) wireless communication system with push notification service, according to some embodiments.

FIG. 5—Communication System with Push Notification Service

Push notifications have become very common in a wide variety of internet communications. For example, push notifications may be communicated to a UE device, such as the UE 106, e.g., via a cellular communication network, to provide instant messaging, email messages, subscription updates, sports scores, and real-time event updates, among many other uses. Push notifications are implemented using any of various push notification services, such as Apple Push Notification Service, Windows Push Notification Service, and Google Cloud Messaging, among others.

FIG. 5 illustrates an exemplary (and simplified) wireless communication system with push notification service, according to some embodiments. It is noted that the system of FIG. 5 is merely one example of a possible system, and embodiments may be implemented in any of various systems, as desired.

As shown, the exemplary wireless communication system includes a UE 106 (e.g., one of the devices 106A through 106N of FIG. 1). The UE 106 may be in communication with a cellular network 502. The cellular network 502 may include a core network of a cellular service provider. In particular, the cellular network 502 may include a base station 102 (e.g., one of the devices 102A through 102N of FIG. 1) and a Mobility Management Entity (MME) 504. Among other functions, the MME 504 may initiate paging for the UE 106. Such paging may be passed from the MME 504 to the UE 106 via the base station 102.

As shown, the cellular network 502 may be connected to a network 506, such as the Internet. A push notification server (PNS) 508 and an application server 510 may each also be in communication with the network 506, so as to allow communicative interconnection between the cellular network 502, the PNS 508, and the application server 510 via the network 506.

For example, when the application server 510 has data to push to the UE 106, the application server 510 may communicate the data to the PNS 508, along with identification information identifying the UE 106 as the intended recipient. The PNS 508 may notify the cellular network that the PNS 508 has a push notification to deliver to the UE 106. In response, the MME 504 may transmit a page to the UE 106. The UE may respond by invoking a Radio Resource Control (RRC) connection with the base station 102, to allow communication of the push notification to the UE 106. The PNS 508 may then provide the push notification to the UE 106 via the cellular network 502.

In this way, any application server 510 connected to the network 506 (e.g., the Internet) may provide push notifications to the UE 106, which is registered with the PNS 508. This process is discussed in greater detail with regard to FIG. 6, below.

Alternatively, the UE 106 could connect to the PNS 508 and the application server 510 via a WCDMA network or other radio access technology.

Figure 6:
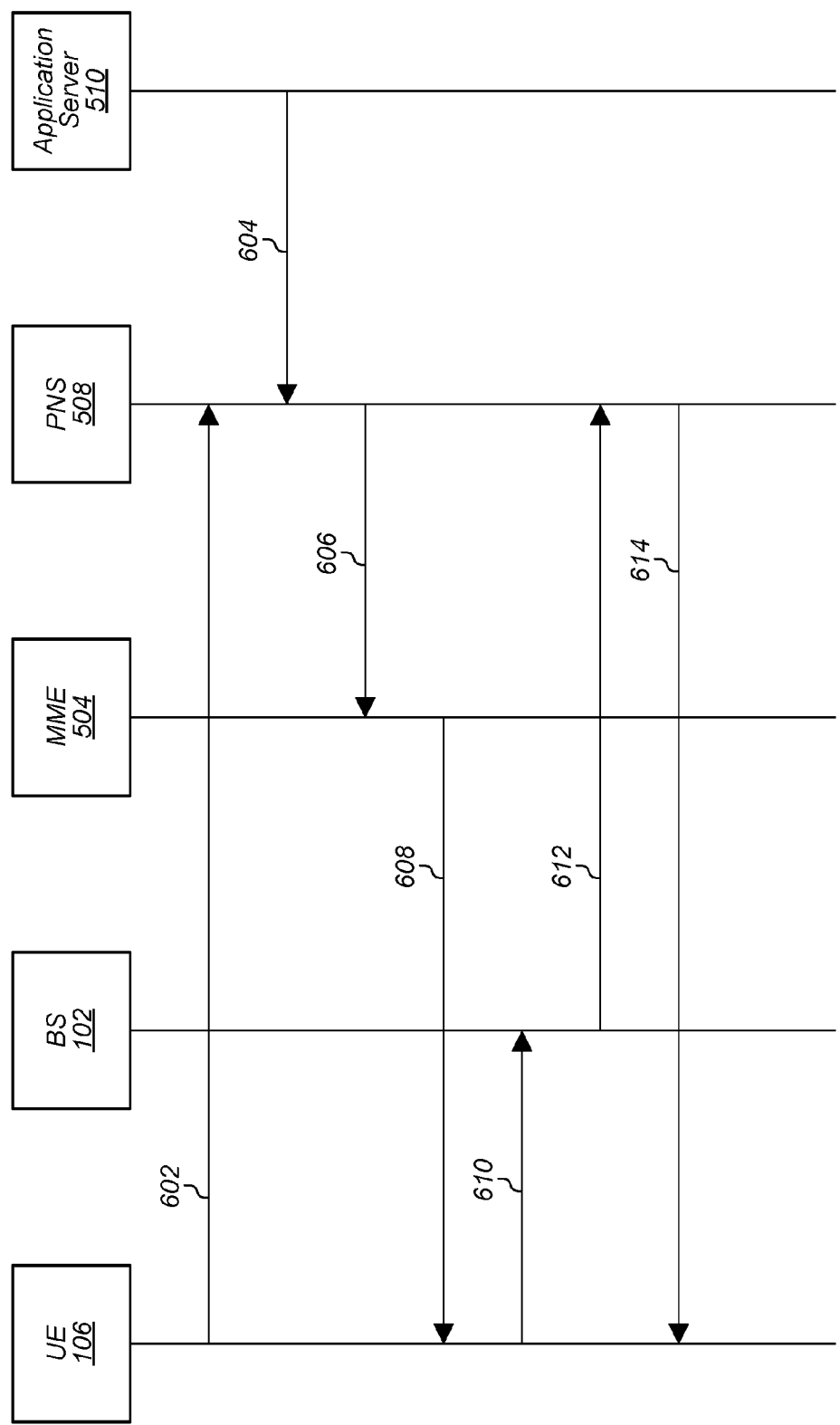
FIG. 6 illustrates an exemplary signal flow diagram for implementing delivery of prioritized push notifications, according to some embodiments.

FIG. 6—Prioritized Push Notifications

As noted above, push notifications are used to communicate a wide variety of data, some of which may be highly time-sensitive, preferably being received within a matter of seconds (such as an instant message), while other data may be less time-sensitive, such that it may be delayed for hours or even days without significant detriment (such as a notification of a new YouTube video on a channel to which a user is subscribed). However, traditionally, when a push notification service attempts to send a push notification to a UE, no information is provided to the UE regarding the urgency of the push notification. Thus, when the UE receives a page from the cellular network (e.g., an MME) indicating that a push notification is available from the push notification service, the UE is expected to immediately invoke an RRC connection to establish a connection to receive the available push notification.

Traditionally, if a UE fails to respond to a notification using transmission control protocol (TCP) acknowledgements, the PNS (or other network component) may infer that the TCP connection to the UE has been lost. In response, the TCP connection may be reset and reestablished, and a new page may be sent. Thus, in a traditional system, if a UE delays a response, the UE may be subjected to repeated TCP retransmissions and reestablishment, and repeated pages until the UE responds. This would increase the amount and frequency of traffic handled by the UE, especially in the UL direction, causing additional power usage on an already power-limited device.

Because a typical user may receive hundreds of push notifications per day, responding only to some, while ignoring others completely, would indirectly lead to increased drain of battery power at the UE, and increased congestion at the network. Furthermore, many of the push notifications may be communicated at high-traffic times, which may further exacerbate these problems. Additionally, infrequent (e.g., selective) response from the UE may result in suboptimal performance by scheduling algorithms on the server, which may lead to a network server overload.

Additional problems may be experienced by a UE having a particularly small form-factor, such as a smart watch or other wearable device. In particular, such small UEs are especially susceptible to exceeding thermal limits at least partly as a result of frequent or extended cellular transmission, which may lead to reduced performance and/or hardware damage. For example, a UE having a small form-factor may overheat as a result of frequent or extended use of multiple radio access bearer (MRAB) uplink (UL) configurations, such as when transmitting VoLTE and best-effort data. In some scenarios, PCT keep-alive messages and/or other messages transmitted by the UE in response to receiving a push notification page may contribute substantially to such thermal problems, especially when such messages are transmitted while the UE is engaged in other cellular communications, such as a VoLTE call.

Therefore, in embodiments of the present disclosure, priority information regarding push notifications may be communicated to the UE, prior to establishment of an RRC connection by the UE. In response, the UE may decide whether to immediately establish a connection to receive the push notification, or whether to wait until some later time. The PNS and/or other network components may receive the priority information, and may use that information to determine whether to forego reestablishing the TCP connection and retransmitting the page message.

FIG. 6 illustrates an exemplary (and simplified) signal flow diagram for implementing delivery of prioritized push notifications within the communications system of FIG. 5, according to some embodiments. It is noted that, for clarity, FIG. 6 omits various entities and signals that are not necessary to illustrate the significant features of the exemplary signal flow.

As shown, the UE 106 may provide to the PNS 508 preference information 602 for push notifications. For example, the preference information 602 may include one or more delivery preferences for push notifications associated with a particular application, such as a user application. In some embodiments, the delivery preferences may have previously been received by the UE as user input, e.g., via a user interface. In other embodiments, the delivery preferences may be default values or may be configured according to some other system configuration procedure.

In some embodiments, the preference information 602 may include one or more delivery preferences for each of a plurality of applications. The delivery preferences may be independent for each of the applications, or may provide a single set of one or more delivery preferences for a group (e.g., all or a subset) of the applications. In some instances, the UE 106 may provide multiple instances of the preference information 602, wherein each instance includes one or more delivery preferences for each of the plurality of applications. The preference information 602 may indicate the one or more applications to which the included delivery preferences apply. For example, in the scenario of FIG. 6, the preference information 602 may include first delivery preferences and may further include an indication that the first delivery preferences apply to a first application.

In some embodiments, the delivery preferences for push notifications associated with a particular application may include a preferred frequency and/or period of delivery for push notifications associated with that application. For example, in some embodiments, the delivery preferences may be selected from the following options: immediately, hourly, daily, and weekly. For example, providing a delivery preference of "immediately" may indicate that the UE prefers to immediately download any push notification associated with that application, while providing a delivery preference of "daily" may indicate that the UE prefers to download push notifications associated with that application only once daily.

In some embodiments, the preference information 602 may be provided to the PNS 508 from a UE or other computing device other than the UE 106. For example, the preference information 602 may be provided to the PNS 508 by a second UE or other computing device associated with user account that is shared by the UE 106 and the second UE or other computing device.

The PNS 508 may store the preference information 602, or some portion thereof. At some later time, the PNS 508 may receive from the application server 510 a push notification 604, including an indication that the UE 106 is the intended recipient. The PNS 508 may store the push notification 604 until it can be delivered to the UE 106.

The PNS 508 may determine that the push notification 604 is associated with an application for which the UE 106 has provided preference information 602. For example, in the scenario of FIG. 6, the PNS 508 may determine that the push notification 604 is associated with the first application. In response, the PNS may provide a notification 606 to the MME that a push notification is available for the UE 106. The notification 606 may include an indication of the first delivery preferences included in the preference information 602. In some embodiments, this indication of the first delivery preferences may be included in the notification 606 as a field (e.g., a 2-bit field) within an IP header of the notification 606. Using two bits, any of four options may be specified for the delivery preferences (e.g., immediately, hourly, daily, and weekly). In some embodiments, other options may be specified (e.g., a number of hours or other time units) using an appropriate number of bits. As one example, the indication of the delivery preferences may be encoded on bits of the differentiated services code point (DSCP) field of the IP header. It is noted that the DSCP field is currently often unused, and thus may be available for encoding the delivery preferences. It is further noted that, when used, the DSCP field may indicate an IP precedence value, which is unrelated to the present embodiments, and which should not be confused with the preference information of the present disclosure.

The MME 504 may receive the notification 606, and may, in response, transmit a page message 608 to the UE 106. The page message 608 may indicate that a push notification is available for the UE, and may include an indication of the delivery preferences included in the notification 606. For example, the MME 504 may copy the bits from the notification 606 (e.g., from the IP header) that indicate the delivery preferences (e.g., the first delivery preferences, in the scenario of FIG. 6), and may pass them into the page message 608, e.g., as a non-critical extension to the page message. Allowing the MME 504 to merely append the bits as an extension to the page message may minimize the processing required of the MME, which may help prevent causing further congestion in the network. Alternatively, the delivery preferences may be indicated in some other location within the page message. For example, if a scrambled temporary IMSI (TIMSI) is used, then the page message would be understood only by the recipient UE, so the delivery preferences could be encoded at any point in the page message 608 expected by that UE, without concern for backward compatibility.

Upon receiving the page message 608, the UE 106 may determine the delivery preferences for the available push notification, as indicated by the page message 608. In response, the UE 106 may determine whether to presently (e.g., immediately) establish (or attempt to establish) a connection (e.g., an RRC connection) to receive the available push notification. For example, if the page message 608 includes an indication that the delivery preferences for the available push notification specify a preference for immediate download of the push notification, then the UE 106 may immediately attempt to establish a connection to receive the available push notification. It should be understood that network congestion or other factors may, in some instances, prevent the UE 106 from succeeding in immediately establishing the connection, even where establishment is immediately attempted.

If, on the other hand, the page message 608 includes an indication that the delivery preferences for the available push notification specify a preference for other than immediate download (e.g., a preference for delayed or periodic download, such as hourly, daily, or weekly downloads, among other options) the UE may take other action to implement the delivery preferences indicated by the page message 608. This may be performed according to any of various embodiments.

As a first example, the UE 106 may, in response to determining the delivery preferences for the available push notification, determine time elapsed since a most recent previous time at which the UE 106 received a push notification having the same delivery preferences. For example, if the first delivery preferences (i.e., the delivery preferences indicated in the page message 608) indicate a preference for daily delivery, then the UE 106 may determine the time elapsed since the UE 106 last received a push notification having a preference for daily delivery (e.g., a push notification associated with the same application as the currently available push notification or associated with some other application having the same delivery preferences).

If the time elapsed meets the period indicated by the delivery preferences indicated by the page message 608, then the UE 106 may (e.g., immediately) attempt to establish a connection (e.g., an RRC connection) to receive the available push notification. If the time elapsed does not meet the period indicated by the delivery preferences indicated by the page message 608, then the UE 106 may determine to not establish a connection at the present time.

For example, if the first delivery preferences indicate a preference for daily delivery, and the time elapsed is equal to or greater than 24 hours, then the UE 106 may establish a connection to receive the available push notification. If, on the other hand, the elapsed time is less than 24 hours, then the UE 106 may not establish a connection to receive the available push notification.

Following the determination to not establish a connection at the present time, the UE 106 may save the page message 608, or some indication thereof, and await subsequent page messages indicating the availability of additional push notifications having the same delivery preferences. Upon receiving a subsequent page message, the UE may repeat the determination of time elapsed since a most recent previous time at which the UE 106 received a push notification having the same delivery preferences. If the time elapsed meets the period indicated by the delivery preferences, then the UE 106 may (e.g., immediately) attempt to establish a connection to download both the push notification identified by the page message 608 and any additional push notifications having the same delivery preferences, such as the one identified by the subsequent page message.

For example, if the first delivery preferences (as indicated in the page message 608) indicate a preference for daily delivery, but the elapsed time was less than 24 hours when the page message 608 was received, then the UE 106 may save the page message 608 (or some indication thereof), and await a subsequent page message indicating the availability of an additional push notification having a preference for daily delivery. When such a subsequent page message is received, if the elapsed time is at least 24 hours, then the UE 106 may establish a connection to receive the push notification identified by the page message 608 and any additional push notifications having a preference for daily delivery that have been received since the UE 106 last received a push notification having a preference for daily delivery.

By delaying establishment of a connection until completion of a period of time specified by the delivery preferences, the UE 106 may reduce the number of connections that are established with the cellular network, and receives the push notifications over a smaller number of connections. This reduces the overhead required to receive the push notifications, which in turn reduces congestion at the network and power usage at the UE 106.

To further decrease the number of connections established with the cellular network, in some embodiments, once a connection has been established, the UE 106 may also download available push notifications having different delivery preferences than the push notification identified by the page message 608. For example, once a connection is established, the UE 106 may download all available push notifications. As another example, once a connection is established, the UE 106 may download all available push notifications having delivery preferences indicating periodic delivery not greater than that indicated by the page message 608. For example, if the page message 608 indicates a preference for daily delivery, then once a connection is established, the UE 106 may download all available push notifications having delivery preferences indicating a preference for daily or hourly, even if less than one hour has elapsed since the UE 106 last received a push notification having a preference for hourly delivery.

In some embodiments, following the determination to not establish a connection at the present time, the UE 106 may further determine time elapsed since a most recent previous time at which the UE 106 received a push notification having different delivery preferences than those indicated in the page message 608. For example, the UE 106 may determine time elapsed since a most recent previous time at which the UE 106 received a push notification having delivery preferences matching those indicated by a previously saved page message. In response to that determination, the UE may determine whether to establish a connection to receive a push notification identified by the saved page message. For example, if the delivery preferences indicated in the page message 608 indicate a preference for weekly delivery, and less than a week as elapsed since the UE 106 last received a push notification with a preference for weekly delivery, the UE 106 may determine to not establish a connection to receive the push notification identified by the page message 608. However, if the UE has a saved page message indicating a preference for daily delivery (e.g., because the saved page message was received less than a day following the previous reception of a push notification with a preference for daily delivery), then the UE may also determine time that has presently elapsed since the UE 106 last received a push notification with a preference for daily delivery. If the time elapsed is at least 24 hours, then the UE 106 may attempt to establish a connection to receive the push notification identified by the saved page message.

By checking the elapsed time for each preference category each time a page message is received, the UE 106 may avoid missing preferred delivery rates. For example, if, 23 hours after the UE 106 received a first push notification having a preference for daily delivery, the UE 106 received a page message identifying a second push notification, and indicating a preference for daily delivery, then the UE would not establish a connection at that time to download the second push notification. If another 23 hours then passed before the UE 106 received a subsequent page message indicating a preference for daily delivery, the result could be the passage of 46 hours between deliveries of push notifications having a preference for daily delivery, even though a push notification was available after only 23 hours. Thus, by checking the elapsed time for each preference category each time a page message is received, the UE 106 may avoid missing preferred delivery rates.

As a second example, the UE 106 may, in response to determining the delivery preferences for the available push notification, determine time elapsed since a most recent previous time at which the UE 106 received a push notification having the same delivery preferences, as described above.

If the time elapsed meets the period indicated by the delivery preferences indicated by the page message 608, then the UE 106 may (e.g., immediately) attempt to establish a connection (e.g., an RRC connection) to receive the available push notification. If the time elapsed does not meet the period indicated by the delivery preferences indicated by the page message 608, then the UE 106 may determine to not establish a connection at the present time, as described above. The UE 106 may further start a timer set to expire at the end of the period indicated by the delivery preferences, relative to the most recent previous time at which the UE 106 received a push notification having the same delivery preferences (or otherwise note the expiration of that period). Upon expiration of that period, the UE 106 may attempt to establish a connection to receive any available push notifications having the preference indicated by the page message 608.

For example, if the first delivery preferences indicate a preference for daily delivery, and the time elapsed is equal to or greater than 24 hours, then the UE 106 may establish a connection to receive the available push notification. If, on the other hand, the elapsed time is less than 24 hours, then the UE 106 may not establish a connection to receive the available push notification, but may start a timer (or use any other timekeeping procedure) to indicate when 24 hours will have expired since the last time the UE 106 received a push notification having a preference for daily delivery. At the end of the 24-hour period (e.g., in response to the timer expiring), the UE 106 may establish a connection to receive any available push notifications having a preference for daily delivery.

As a third example, the UE 106 may establish a connection to receive available push notifications according to one or more regular periods of time. For example, the UE 106 may cyclically track a period of time corresponding to a preferred rate of delivery for some push notifications. Upon expiration of the period of time, the UE 106 may establish a connection to receive any available push notifications having delivery preferences matching the tracked period of time. In some embodiments, the UE 106 may establish the connection only if a page message indicating the applicable delivery preferences was received during the current period.

For example, the UE 106 may maintain a timer (or other timekeeping procedure) to cyclically indicate a 24-hour period. Upon receiving the page message 608, the UE 106 may determine that the page message 608 indicates a preference for daily delivery. In response, upon expiration of the 24-hour period in which the page message 608 is received, the UE 106 may establish a connection to receive the push notification identified by the page message 608, as well as any other available push notifications having a preference for daily delivery.

In connection with any of the above embodiments, the UE 106 may consider additional factors in determining whether to attempt to establish a connection to receive the available push notification identified by the page message 608. For example, if the page message 608 indicates a preference for infrequent (e.g., daily or weekly) delivery, such that a reasonable additional delay in receiving the push notification is unlikely to significantly detriment the user experience, then the UE 106 may delay establishment of the connection until the UE 106 is in a more favorable communication environment. For example, the UE 106 may delay establishment of the connection until a low-traffic time on the cellular communication network, such as early morning. As another example, the UE 106 may delay attempting to receive the push notification until the UE may establish a connection with an alternate network, such as a Wi-Fi network, thereby entirely avoiding establishment of a connection with the cellular network. Other factors may also be considered by the UE 106.

Once the UE has determined (after any applicable delay) to attempt to establish a connection to receive the push notification identified by the page message 608, it may transmit connection request 610 (e.g., an RRC Connection Request) to the base station 102. Additional negotiations (not separately shown) may follow to establish the connection (e.g., an RRC connection) between the UE 106 and the BS 102. Following establishment of this connection, the base station 102 may provide notification 612 to the PNS 508.

In response, the PNS 508 may provide the push notification 614 to the UE 106. As discussed above, in some embodiments, multiple push notifications may be provided via the established connection.

After sending the notification 606, the PNS may resend the notification 606 if it does not receive the notification 612 within an expected window of time. The PNS may determine the expected window of time based at least partly on the preference information 602. For example, if the preference information 602 indicates that the UE prefers to download push notifications associated with the relevant application only once daily, then the PNS may delay resending the notification 606 until the notification 612 has not been received for at least an appropriate amount of time (e.g., more than one day following the notification 606 or more than one day following the most recent request to download push notifications associated with the relevant application). As a result, the UE may delay responding to the page message 608, without being subjected to repeated TCP reestablishment and repeated pages during the delay period.

It should be understood that the steps described above in association with FIG. 6 are merely exemplary, and that the methods described may include novel aspects even without including all steps illustrated in FIG. 6. For example, in some embodiments, the UE 106 may perform a method as described in FIG. 6, but beginning with receipt of the page message 608 and/or ending with transmission of the connection request 610.

Additional Examples

Further techniques may be implemented according to any of the following examples.

A method may include steps performed by, e.g., a push notification server. The PNS may receive, from a mobile device, first preference information for push notifications associated with a first user application. The PNS may receive, from an application server, after receiving the first preference information, a first push notification associated with the first user application, the first push notification addressed to the mobile device. The PNS may provide, to a cellular communication network hosting the mobile device, in response to receiving the first push notification, a first notification that the first push notification is available for the mobile device. The first notification may include the first preference information. The PNS may receive, from the cellular communication network, an indication that the mobile device has established an active connection with the cellular communication network. The PNS may provide the first push notification to the mobile device, via the cellular communication network.

In some scenarios, the PNS may determine, based on the first preference information, a delay period to wait after providing the first notification; and provide, to the cellular communication network, a second notification that the first push notification is available for the mobile device, wherein providing the second notification is in response to determining that the indication that the mobile device has established an active connection with the cellular communication network has not been received within the delay period.

The PNS may not provide to the cellular communication network any notification that the first push notification is available for the mobile device during the delay period after providing the first notification.

In some scenarios, the first preference information may indicate a preferred period of delivery for push notifications associated with the first user application.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
by a mobile device:
providing, to a push notification service, first preference information for push notifications associated with a first user application;
receiving a page indicating that a push notification is available for download by the mobile device, wherein the page indicates the first preference information;
determining, based on the indicated first preference information, a delay period to wait before downloading the available push notification; and
downloading the available push notification in response to expiration of the determined delay period.

2. The method of claim 1, further comprising:
providing, to the push notification service, second preference information for push notifications associated with a second, different user application.

3. The method of claim 1, further comprising:
for each of a plurality of user applications, providing independent preference information for push notifications associated with the respective user application.

4. The method of claim 1, wherein the first preference information indicates a preferred period of delivery for push notifications associated with the first user application.

5. The method of claim 4, further comprising:
providing, to the push notification service, second preference information for push notifications associated with a second, different user application, wherein the second preference information indicates a preferred period of delivery for push notifications associated with the second user application.

6. The method of claim 5, wherein the preferred period of delivery for push notifications associated with the first user application is different than the preferred period of delivery for push notifications associated with the first user application.

7. The method of claim 5, wherein the preferred period of delivery for push notifications associated with the first user application is the same as the preferred period of delivery for push notifications associated with the first user application.

8. The method of claim 4, wherein the preferred period of delivery comprises one of: immediately, hourly, daily, and weekly.

9. The method of claim 4, wherein determining the delay period comprises:
determining time elapsed since a most recent previous time at which the mobile device downloaded at least one push notification having the preferred frequency of delivery indicated by the first preference information; and
determining the delay period to be the difference between the preferred period of delivery and the determined time elapsed.

10. The method of claim 1, wherein determining the delay period is further based on a download history of a push notification associated with the indicated preference information.

11. The method of claim 1, wherein determining the delay period is further based on time elapsed since a most recent previous download of push notifications associated with the indicated preference information.

12. The method of claim 1, further comprising:
receiving user input associating the first preference information with push notifications associated with a first user application.

13. The method of claim 1, wherein the mobile device does not receive, during the determined delay period, a second page indicating that the same push notification is available for download by the mobile device.

14. An apparatus comprising:
at least one memory;
at least one processor coupled to the at least one memory, the at least one processor configured to cause the apparatus to:
provide, to a push notification service, first preference information for push notifications associated with a first user application;
receive a page indicating that a push notification is available for download by the apparatus, wherein the page indicates the first preference information;
determine, based on the indicated first preference information, a delay period to wait before downloading the available push notification; and
download the available push notification in response to expiration of the determined delay period.

15. The apparatus of claim 14, wherein the at least one processor is further configured to cause the apparatus to:
provide, to the push notification service, second preference information for push notifications associated with a second, different user application.

16. The apparatus of claim 14, wherein the first preference information indicates a preferred period of delivery for push notifications associated with the first user application.

17. The apparatus of claim 14, wherein the delay period is determined further based on a download history of a push notification associated with the indicated preference information.

18. A non-transitory computer-readable memory medium storing program instructions executable by a mobile device which, when executed, cause the mobile device to:
provide, to a push notification service, first preference information for push notifications associated with a first user application;
receive a page indicating that a push notification is available for download by the mobile device, wherein the page indicates the first preference information;
determine, based on the indicated first preference information, a delay period to wait before downloading the available push notification; and
download the available push notification in response to expiration of the determined delay period.

19. The non-transitory computer-readable memory medium of claim 18, wherein the first preference information indicates a preferred period of delivery for push notifications associated with the first user application.

20. The non-transitory computer-readable memory medium of claim 18, wherein the delay period is determined further based on a download history of a push notification associated with the indicated preference information.

* * * * *